H. L. BOYER.
METHOD OF MAKING STORAGE BATTERY JARS.
APPLICATION FILED AUG. 6, 1917.
1,352,418.                                      Patented Sept. 7, 1920.
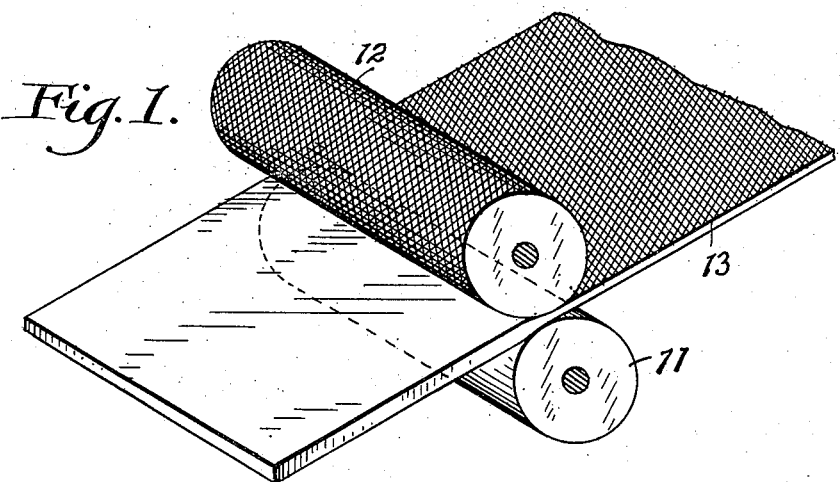
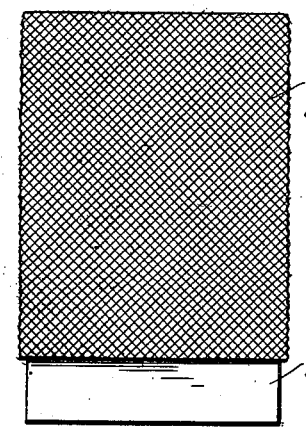
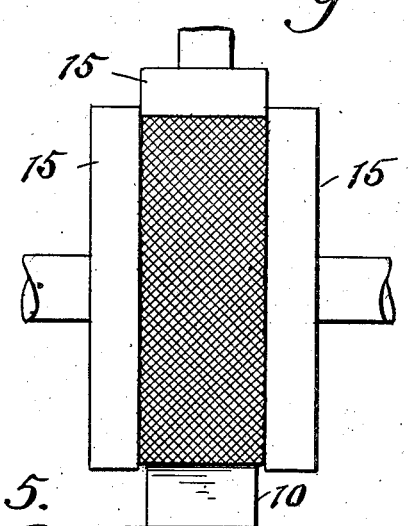
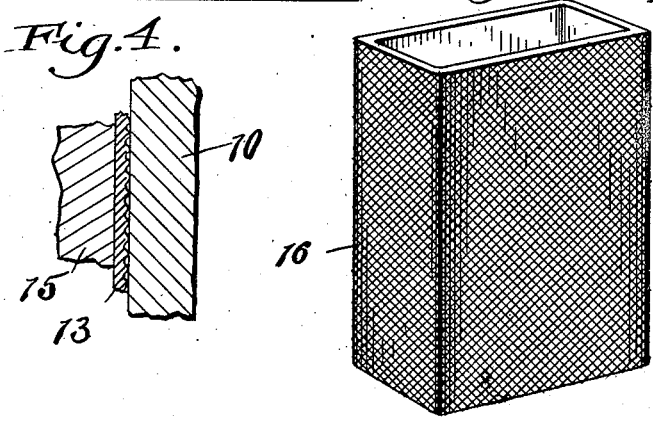
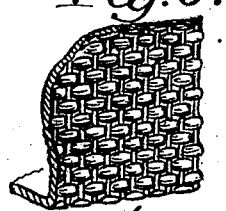
Inventor:
Harry L. Boyer
By Thurston & Kwis
attys

UNITED STATES PATENT OFFICE.

HARRY L. BOYER, OF TRENTON, NEW JERSEY, ASSIGNOR TO JOS. STOKES RUBBER COMPANY, OF TRENTON, NEW JERSEY, A CORPORATION OF NEW JERSEY.

METHOD OF MAKING STORAGE-BATTERY JARS.

1,352,418.     Specification of Letters Patent.     Patented Sept. 7, 1920.

Application filed August 6, 1917. Serial No. 184,560.

*To all whom it may concern:*

Be it known that I, HARRY L. BOYER, a citizen of the United States, residing at Trenton, in the county of Mercer and State of New Jersey, have invented a certain new and useful Improvement in Methods of Making Storage-Battery Jars, of which the following is a full, clear, and exact description.

This invention relates to certain improvements in the method of making hard rubber storage battery jars. The principal object of the invention is to provide a method which is less expensive and simpler than the methods in use heretofore, and which produces a jar which is neat and attractive in appearance.

Rubber storage batteries are made at the present time by wrapping soft uncured rubber in sheet form about a core, and after the rubber has been formed in the shape of the jar on the core and pressed against the same, the jar and core are placed in a vulcanizer to harden the rubber and cause the joints to be thoroughly knitted together after which the finished jar is stripped from the core.

It is customary in forming the soft uncured jar on the core, to cover the outer surface of the rubber, particularly that which forms the four sides of the jar, with tin in sheet form, the latter serving to give the jar a polished appearance and having the further function of preventing the rubber pulling away from the core by sticking to the pressure device which is used to press the rubber onto the core.

By the present invention I am enabled to avoid entirely the necessity for the use of the sheet tin, and at the same time the rubber does not cling to the pressure device and pull away from the core, and the jar which is produced by the method has an external appearance which is very attractive and satisfactory.

My invention may be briefly summarized as consisting in certain novel steps of an improved method as will be described in the specification and set forth in the appended claims.

In the accompanying sheet of drawings wherein I have shown several steps of the process of forming the jar and also the completed jar, Figure 1 illustrates the preferred way in which the rubber is given an uneven or irregular surface on one side in the accomplishment of the objects of my invention; Fig. 2 is a side view of the unfinished jar formed by wrapping about the core, rubber formed and treated as in Fig. 1; Fig. 3 shows in elevation the soft jar on the core and reciprocating plungers which constitute the preferred means of pressing the rubber against the faces of the core; Fig. 4 is an enlarged detail view showing particularly the uneven outer surface of the sheet rubber and the function of the minor depressions and projections during the pressing operation; Fig. 5 is a perspective view of the finished jar; and Fig. 6 is an enlarged fragmentary view thereof showing the pattern or configuration of the outer surface of the jar.

In forming hard rubber storage battery jars, soft plastic rubber in sheet form is wrapped about the sides of a core 10 and a piece of the same material is placed over the end of the jar, after which the edge portions of the rubber are lapped and pressed together. Heretofore these sheets were smooth surfaced on both sides, and one surface of the sheet which is wrapped about the sides of the jar was covered with a layer of thin sheet tin for the purposes previously mentioned.

In carrying out my invention in the preferred manner the rubber is given an uneven surface on one side before it is wrapped around the core, and preferably this is done by running the sheets through a pair of rolls 11 and 12, one of which has a patterned surface which is transferred to one side of the sheet illustrated at 13. This sheet when cut the proper dimensions is wrapped around the sides of the core in the manner shown at 14 in Fig. 2, with the pattern or uneven surface on the outside, and without having this surface covered with the sheet tin employed with the prior methods.

This patterned or uneven surface which is given to the outer face of the sheet consists of closely arranged minor projections and depressions preferably giving the sheet the appearance of roughly woven cloth or a regular pattern effect.

After the rubber is wrapped around the jar and a piece of rubber is placed over the end with the rubber overlapping where the joints occur, the rubber is pressed very firmly against the core so that it will adhere to the latter at all points and so that the seams will be closed at all points. This can be done in different ways, but I prefer to accomplish it by the use of smooth faced plungers 15 which simultaneously press all points of the soft jar in against the four sides and end of the core in the manner illustrated in Fig. 3, which shows three of the five plungers preferably employed. When these plungers are retracted, or when the pressure is relieved, the rubber is not pulled away from the core, but by reason of the minor closely arranged depressions and projections on the outer surface of the rubber, air is between the face of each plunger and the surface of the rubber, and there is absent the suction which heretofore would result in the rubber pulling away from the core when the pressure is relieved. The manner in which air may enter between the plunger and rubber is clearly illustrated in the enlarged detail view of Fig. 4.

After the rubber has been pressed against the core in the manner illustrated in Fig. 3, the core and the jar are placed in a vulcanizer and allowed to remain therein until the jar is thoroughly cured. Then after removal from the vulcanizer the jar is stripped from the core, this jar being shown at 16 in Fig. 5. This jar is neat and attractive in appearance as the color at the outer surface is very nearly uniform and the jar does not have the unsightly streaked yellowish-brown appearance that jars have after vulcanization if the outer surfaces are not covered with sheet tin.

I do not desire to be confined to the precise details shown and described, but aim in my claims to cover all modifications which do not involve a departure from the spirit and scope of my invention.

Having thus described my invention, what I claim is:—

1. The method of making a hard rubber jar which comprises forming a strip of unvulcanized rubber with a roughened surface on one side, placing the same about a core with the roughened surface outward, pressing the rubber against the core, and vulcanizing the rubber on the core.

2. The process of making hard rubber jars which comprises forming a sheet of soft unvulcanized rubber with minor projections and depressions on one side, wrapping the sheet about a core with the uneven surface outward, squeezing the rubber against the core by external pressure, and vulcanizing the jar thus formed on the core.

3. The method of making a hard rubber jar which comprises running the rubber between a pair of rolls, one having a smooth surface and the other a rough or irregular surface so that the sheet will have minor projections and depressions on one side, wrapping the sheet about a core with the roughened surface on the outside, squeezing the rubber against the core, and vulcanizing the jar thus formed on the core.

4. The method of making a hard rubber jar which comprises applying plastic uncured rubber in sheet form to the sides and one end of a core, pressing the rubber against the core by applying pressing means to the rubber with air pockets between the surface of the rubber and the pressing means, and vulcanizing the jar on the core.

In testimony whereof I hereunto affix my signature.

HARRY L. BOYER.